United States Patent [19]

Abel et al.

[11] Patent Number: 4,576,452
[45] Date of Patent: Mar. 18, 1986

[54] REFLECTIVE SCHMIDT SYSTEM WITH NONROTATIONALLY SYMMETRIC CORRECTOR

[75] Inventors: Irving R. Abel, Lexington; Marcus R. Hatch, Waltham, both of Mass.

[73] Assignee: Honeywell Inc., Minneapolis, Minn.

[21] Appl. No.: 500,462

[22] Filed: Jun. 2, 1983

[51] Int. Cl.⁴ .............................................. G02B 5/10
[52] U.S. Cl. .................................... 350/620; 350/619
[58] Field of Search ............... 350/294, 293, 505, 504, 350/442, 620, 619

[56] References Cited

U.S. PATENT DOCUMENTS 3,963,328 6/1976 Abel ...................................... 350/294

FOREIGN PATENT DOCUMENTS 830277 5/1981 U.S.S.R. .............................. 350/619

*Primary Examiner*—Jon W. Henry
*Attorney, Agent, or Firm*—John S. Solakian; Albin Medved

[57] ABSTRACT

Wide field of view correction for wide spectral band imaging systems is achieved in reflective versions of the Schmidt and Schmidt-Cassegrain systems by the use of a fold mirror which also serves as a corrector plate. A method for fabricating the corrector plate is described.

9 Claims, 3 Drawing Figures

REFLECTIVE SCHMIDT SYSTEM WITH NONROTATIONALLY SYMMETRIC CORRECTOR

BACKGROUND OF THE INVENTION

The present invention relates to optical imaging systems, and more particularly to wide field of view optical systems operating over a wide spectral band, and having a Schmidt or Schmidt-Cassegrain configuration.

The Schmidt and Schmidt-Cassegrain designs are well known methods of achieving wide field of view optical imaging which are particularly desirable because they use primarily reflective elements. In the Schmidt system, a reflective spherical mirror focuses energy from the scene of interest onto a spherical focal surface. To correct for spherical aberration introduced by the spherical mirror, an aspheric refractive corrector plate ("Schmidt plate") is placed at the center of curvature of the spherical mirror. Because of its simplicity, the Schmidt system is easily aligned.

In the Schmidt-Cassegrain system, a second curved reflective element is placed between the primary spherical mirror and the focal surface of a simple Schmidt system, in order to produce an optical system which has a flat focal plane and is more compact, and which retains the basic correction capacity and other advantages of the Schmidt system.

Both systems have several limitations. First, higher order (oblique) spherical aberration will limit the field of view which can be utilized without image degradation, even if monochromatic light is used. Second, at narrower fields of view, the image quality is limited by spherochromatism (spherical aberration caused by variation of wavelength in the incident light), which can be reduced by addition of a second plate of different material (an "achromatic corrector plate") at the center of curvature of the spherical mirror.

In a number of applications requiring broader spectral coverage, the difficulty in correcting chromatic aberration, and the limitations in materials tend to reduce the effectiveness of the Schmidt plate correction concept. As a result, systems requiring broad band coverage and wide field of views have tended to use purely reflective designs (which eliminate the problem of chromatic aberration). Some of these systems use the Schmidt principle, with the aspheric deformation applied to a mirror, rather than to a refractive plate. These systems generally involve off-axis apertures and/or off-axis fields of view, resulting in relatively larger system sizes. In all cases however, the aspheric surface has been rotationally symmetric, whether placed on a flat or curved folding mirror. For a detailed description of these prior design concepts, see I. R. Abel and M. R. Hatch, "The Pursuit of Symmetry in Wide-Angle Reflective Optical Design," Proc. 1980 International Lens Design Conference, SPIE Vol. 237, p. 271 (1980).

It is accordingly an object of the present invention to provide an optical imaging system suitable for wide field of view and wide spectral band imaging which does not require off-axis or off-field of view designs, and which is well-corrected.

SUMMARY OF THE INVENTION

The above and other objects of the present invention are achieved by utilizing a reflective Schmidt or Schmidt-Cassegrain system configuration in combination with a tilted nonrotationally symmetric aspherized mirror placed between the optical system and the scene of interest, generally at or near the center of curvature of the primary focusing mirror. This corrector mirror encodes both the correction for traditional aberrations associated with the Schmidt designs, as well as the wavefront error introduced by tilting the fold mirror.

BRIEF DESCRIPTION OF THE DRAWINGS

The advantages of the foregoing configurations of the present invention will become more apparent upon reading the accompanying detailed description in connection with the figures in which.

DETAILED DESCRIPTION OF THE PREFERRED EMBODIMENT(S)

Figure 1A:
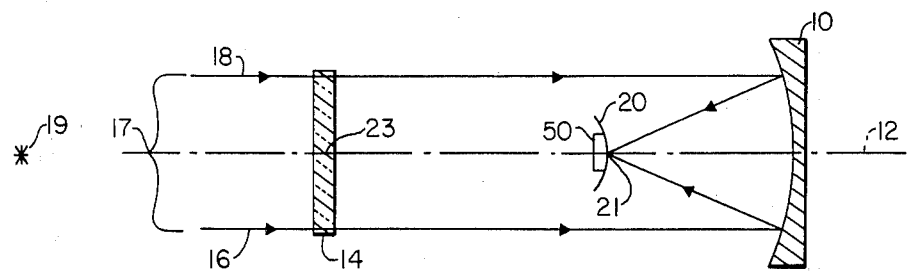
FIG. 1A shows a cross-section through a prior art Schmidt optical system.

Referring to FIG. 1A, a traditional Schmidt optical imaging system is shown, comprising a spherical mirror 10, a refractive corrector plate 14, and an optical detector 50, all positioned symmetrically about optical axis 12. Optical detector 50 is placed on curved focal surface 20, located at the focal point 21 of spherical mirror 10 on axis 12. Aspheric corrector plate 14, placed at the center of curvature 23 of spherical mirror 10, encodes the surface deformation required to correct the system for the spherical aberration introduced by mirror 10. Because mirrors 10 and 14 are positioned symmetrically about axis 12, the deformation encoded in corrector plate 14 is also rotationally symmetric. Light beam 17 from scene 19, bounded by optical rays 16 and 18 is refracted through corrector plate 14, and is focused by mirror 10 onto optical detector 50 on focal surface 20. Because of the general limited transmission of refractive materials, and the variability of refractive index as a function of wavelength of light, the design of the system of FIG. 1A is limited in spectral range.

Figure 1B:
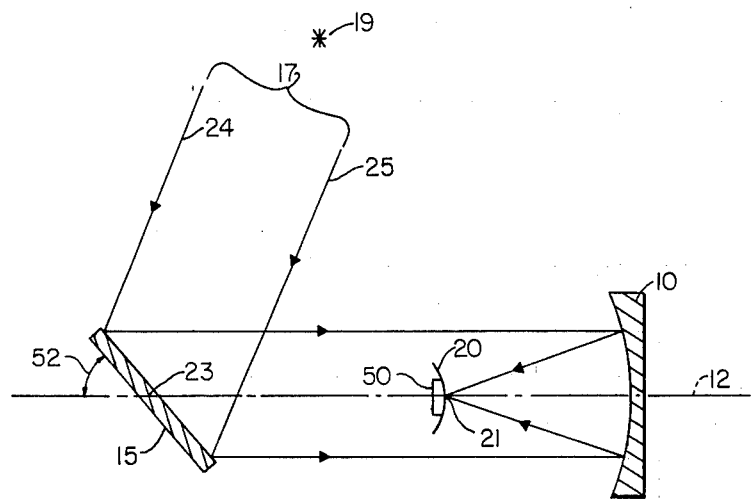
FIG. 1B shows a cross-section through the Schmidt configuration of the present invention in which a fold mirror with nonrotationally symmetric aspheric correction replaces the traditional Schmidt refractive corrector element.

In FIG. 1B, a fold mirror 15 tilted with respect to the optical axis 12 replaces refractive corrector plate 14. The center of the surface of mirror 15 facing mirror 10 lies substantially at the center of curvature 23 of mirror 10. The reflective surface of mirror 15 primarily encodes the correction of two effects: first, a correction of spherical aberration in the wavefront of optical beam 17 introduced by spherical mirror 10, and second, a correction for the asymmetry caused by the tilt of the corrector mirror 15 with respect to optical axis 12. Tilt angle 52 is selected in combination with the focal length and diameter of mirror 10, such that beam 17 is not obstructed by either mirror 10 or optical detector 50. In addition, the tilt of mirror 15 may be minimized in order to minimize the nonrotationally symmetric component of the aspheric correction to mirror 15, thus providing better image quality.

Figure 2:
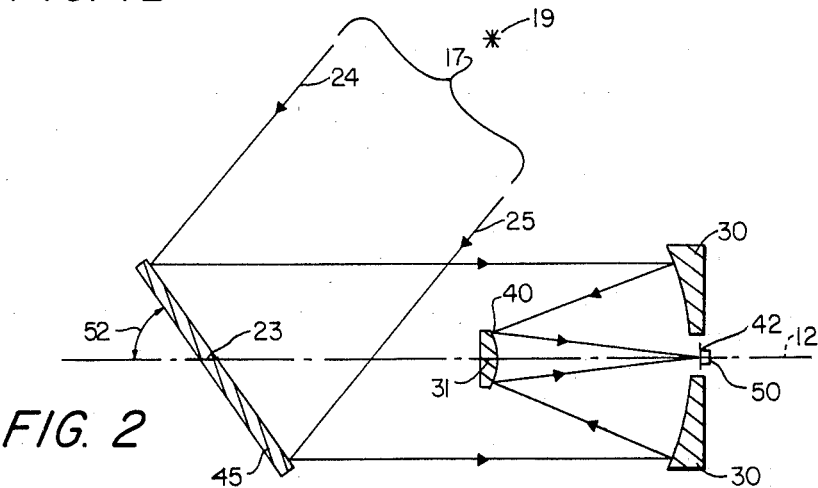
FIG. 2 shows a cross-section through a Schmidt-Cassegrain optical system in which a fold mirror with nonrotationally symmetric aspheric correction replaces the traditional Schmidt refractive corrector element.

Referring to FIG. 2, an alternate embodiment is shown in which a nonrotationally symmetric corrector fold mirror 45 replaces the traditional refractive corrector plate in a traditional Schmidt-Cassegrain optical system. Tilted fold mirror 45 replaces a refractive corrector plate (similar to plate 14 of FIG. 1A) which may be, but need not be, at the center of curvature 23 of spherical mirror 30. A secondary convex mirror 40 is placed at a point 31 between primary mirror 30 and optical detector 50 such that the focused portion of beam 17 is folded to provide a more compact design and/or to achieve a flat focal plane 42, as shown. Optical detector 50 is placed at focal plane 42, also located along optical axis 12. The distances between mirrors 30, 40 and 45 and optical detector 50 may be adjusted in order to achieve optimum image quality. If necessary, mirror 30 may have an annular shape as shown in FIG. 2, but it is realized that this is not required.

It should be further understood that a small aspheric or cylindrical deformation may be applied to the surface of mirrors 10, 30 or 40 in order to further improve image quality.

The aspheric correction to be encoded on corrector fold mirror 15 or 45 may be determined and fabricated in a number of ways. The following description is provided merely as an illustration of one method. For a planar wavefront, as that of beam 17, circular lines of equal phase project onto the tilted mirror 15 or 45 as ellipses. For this reason, a polynomial in which each term describes elliptical lines of constant deformation may be selected to define the aspheric corrector surface. The aspheric correction might be defined as follows:

$$z = a_1(c_1X^2 + y^2) + a_2(c_2X^2 + y^2)^2 + a_3(c_3X^2 + y^2)^3 + a_4(c_4X^2 + y^2)^4 + a_5(c_5X^2 + y^2)^5$$

where z is the deformation of the surface of mirror 15 or 45, x and y are the cartesian surface coordinates on mirror 15 and a and c are constants. The values of constants a and c may be determined by a computer optimization process which minimizes optical aberration over the desired field of view. This technique has been shown to produce diffraction limited performance in a wide variety of broadband, wide field of view Schmidt and Schmidt-Cassegrain configurations, for example, operating in the infrared or visible to infrared regions. (See, I. R. Abel and M. R. Hatch, "Wide Field Correction in Reflective Schmidt Systems by a Nonrotationally Symmetric Element", delivered on Apr. 20, 1983 at the International Technical Conference, Geneva, Switzerland, and submitted for publication in the SPIE Proceedings.)

In order to fabricate the mirror 15 or 45 as described by the above equation, the surface deformation may be divided into two components. The first, a rotationally symmetric component will be much larger, and which may be fabricated by well-known techniques of computer controlled machining. The second, a residual nonrotationally symmetric component is much smaller, and may be added to the mirror surface by hand figuring to a null correction.

Having described the invention, what is claimed as new and novel and for which it is desired to secure Letters Patent is:

1. An optical system for imaging energy from a desired scene of interest, said system having an optical axis and comprising:
   A. a first substantially spherical concave mirror means positioned substantially about said optical axis;
   B. an optical detection means located substantially at the position of best focus of said first spherical mirror means; and
   C. corrector fold mirror means located substantially at the center of curvature of said first spherical mirror means substantially along or parallel to said optical axis, wherein said corrector fold mirror means is tilted relative to said optical axis in order to receive energy from said scene of interest and reflect said received energy substantially along said optical axis onto said first spherical mirror means, and wherein said corrector fold mirror means comprises nonrotationally symmetric deformations for the correction of optical aberrations of said optical system, said nonrotationally symmetric deformations thereby providing said corrector fold mirror means with substantially no symmetry of its surface around said optical axis.

2. Apparatus as in claim 1 wherein said corrector fold mirror means further comprises means for correction of spherical aberrations which result from the interaction of said energy with said first spherical mirror means, and wherein said corrector fold mirror means further comprises means for correction of the tilt of said corrector fold mirror means relative to said optical axis.

3. Apparatus as in claim 1 wherein a substantially spherical convex mirror means is placed between said first substantially spherical mirror means and said optical detection means.

4. Apparatus as in claim 1 further comprising first means for adjusting the distance between said corrector fold mirror means and said first substantially spherical mirror means, and second means for adjusting the distance between said second spherical mirror means and said optical detection means in order to achieve optimum performance of said imaging system.

5. An optical system for imaging energy from a desired scene of interest, said system having an optical axis and comprising:
   A. an aspherical concave mirror means positioned substantially about said optical axis;
   B. an optical detection means located substantially at the position of best focus of said aspherical mirror means; and
   C. corrector fold mirror means located substantially at the center of curvature of said aspherical mirror means substantially along or parallel to said optical axis, wherein said corrector fold mirror means is tilted relative to said optical axis in order to receive energy from said scene of interest and reflect said received energy substantially along said optical axis onto said aspherical mirror means, and wherein said corrector fold mirror means comprises nonrotationally symmetric deformations for the correction of optical aberrations of said optical system, said nonrotationally symmetric deformations thereby providing said correction fold mirror means with substantially no symmetry of its surface around said optical axis.

6. Apparatus as in claim 5 where said corrector fold mirror means further comprises means for correction of spherical aberrations which result from the interaction of said energy with said aspherical mirror means, and wherein said corrector fold mirror means further comprises means for correction of the tilt of said corrector fold mirror means relative to said optical axis.

7. Apparatus as in claim 5 wherein said aspherical mirror means comprises a substantially cylindrical deformation.

8. Apparatus as in claim 5 wherein a substantially spherical convex mirror means is placed between said aspherical mirror means and said optical detection means.

9. Apparatus as in claim 5 further comprising aspherical mirror means for adjusting the distance between said corrector fold mirror means and said aspherical mirror means, and second means for adjusting the distance between said second spherical mirror means and said optical detection means in order to achieve optimum performance of said imaging system.

* * * * *